United States Patent

Black et al.

[11] Patent Number: 5,855,397
[45] Date of Patent: Jan. 5, 1999

[54] HIGH-PRESSURE SEALABLE CONNECTOR FOR A PRESSURE SENSOR

[75] Inventors: John W. Black, Columbus; Phil Oldham, Indianapolis; Matthew Schneider, Seymour, all of Ind.

[73] Assignee: Cummins Engine Company, Inc., Columbus, Ind.

[21] Appl. No.: 831,821

[22] Filed: Apr. 2, 1997

[51] Int. Cl.⁶ ........................................ F16L 35/00
[52] U.S. Cl. ........................ 285/93; 285/350; 285/355; 285/917; 277/608
[58] Field of Search .................... 285/350, 917, 285/910, 332.2, 339, 355, 93; 277/608

[56] References Cited

U.S. PATENT DOCUMENTS

| | | | |
|---|---|---|---|
| 448,765 | 3/1891 | Kaiser | 285/350 X |
| 1,834,581 | 12/1931 | Ferrell et al. | |
| 2,029,606 | 2/1936 | Bredtschneider | 285/910 X |
| 2,345,071 | 3/1944 | Reynst et al. | |
| 2,926,937 | 3/1960 | Parsons | 285/350 |
| 3,100,656 | 8/1963 | MacArthur | 285/350 X |
| 3,114,471 | 12/1963 | Kropfl | 285/917 X |
| 3,211,478 | 10/1965 | Batzer | |
| 3,257,119 | 6/1966 | Bialkowski | |
| 3,258,281 | 6/1966 | Scott et al. | |
| 4,296,954 | 10/1981 | Fujimaki et al. | 285/355 X |
| 4,643,467 | 2/1987 | Wood | |
| 5,115,676 | 5/1992 | Lee | |
| 5,129,657 | 7/1992 | McManigal | |
| 5,135,269 | 8/1992 | Babuder | |
| 5,169,182 | 12/1992 | Hashimoto | 285/917 X |
| 5,366,261 | 11/1994 | Tadahiro et al. | |
| 5,423,580 | 6/1995 | Mohlenkamp | |
| 5,433,454 | 7/1995 | Ramberg | |
| 5,628,517 | 5/1997 | Jia | 285/917 X |

FOREIGN PATENT DOCUMENTS

| | | |
|---|---|---|
| WO89/03495 | 4/1989 | European Pat. Off. |
| E21B 17/042 | 2/1997 | European Pat. Off. |
| 1 288 576 | 9/1972 | United Kingdom |
| 1 586 744 | 3/1981 | United Kingdom |
| 2 064 041 | 6/1981 | United Kingdom |
| 2117469 | 10/1983 | United Kingdom ..................... 285/355 |
| 2 221 002 | 1/1990 | United Kingdom |

OTHER PUBLICATIONS

United Kingdom Patent Office, Application No. GB 9803240.2, Date of Search: Apr. 28, 1998 and Claime searched 1–20.

Primary Examiner—Dave W. Arola
Attorney, Agent, or Firm—Leydig, Voit & Mayer

[57] ABSTRACT

An improved sealable connector has a geometry which effects reliable sealing upon assembly. The connector is useful, for example, for connecting a pressure sensor to a fuel pump accumulator in a fuel injection system. The connector includes a male member, a female member, and an annular seal disc which compressibly seats between the male and female members. The male member has a tip with a flat annulus at an innermost radius surrounding a fluid-delivery bore. A frustoconical section of the tip extends radially outwardly from the annulus, sloping away from the plane of the annulus at about 5°–15°, for example. The female member has a cavity shaped to receive the male member, the cavity having a bottom defined by a flat annular seat surrounding another fluid-delivery bore. The seal disc is compressed between the flat seat of the female cavity and the planar/frustoconical tip of the male member. Axial compressive loads on the disc are concentrated under the planar annulus such that the disc has a radially-inward zone of plastic compression adjacent to the fluid-carrying bore, this plastic compression zone being radially-outwardly surrounded by an elastic compression zone.

17 Claims, 2 Drawing Sheets

HIGH-PRESSURE SEALABLE CONNECTOR FOR A PRESSURE SENSOR

BACKGROUND OF THE INVENTION

The present invention generally relates to a seal between communicating members. More particularly, the present invention relates to a structure forming a sealable fluid-medium connection having a geometry which provides improved sealing at high fluid pressures.

A highly pressurized fluid system is demanding on seals between joined members, such as conduit members in sealed fluid communication with each other. For example, in a fuel injection system for a diesel engine, fuel pressures are often around 30,000 psig, requiring high strength components and seals.

A high-pressure fuel injection system can have a fluid pressure sensor which provides a useable output signal corresponding to fuel pressure in a fuel pump accumulator. The output signal may be directed to an engine control processor. Such a fuel pressure sensor may be mounted to a port in a wall of the accumulator.

A need exists for a structure providing a reliable seal connection in a system carrying or containing fluids at high pressures, such as a connection for a pressure sensor in a fuel injection system.

Conventionally, high-pressure seals have threaded connections which are tightenable to increase compressive loads on a deformable seal disc or ring located between connected members. In order to obtain an adequate sealing compression, previous connectors required tightening to a certain precise torque, and sometimes a very high torque. Depending on the connector design and the particular seal material subjected to high loading, overtightening a conventional seal may cause an uncontrolled plastic deformation and extrusion of the seal material, resulting in load loss and seal failure. Accordingly, a seal design is desired which is forgiving in the amount of torque required, providing adequate sealing within a range of torques, and which reduces the risk of causing seal failure by overdeformation of the seal material.

Additionally, a seal structure is desirable which minimizes the amount of torque required to set the seal. Such a lower torque would ease assembly during manufacture or repair.

SUMMARY OF THE INVENTION

The present invention provides an improved sealable connector which requires few parts, and which has an improved geometry that results in effective sealing at high pressures. To this end, a sealable fluid connector is provided which includes a male connector member, a female connector member, and a seal disc. These parts are cooperatively designed as follows.

The male connector member has a cylindrical body with a longitudinal bore. The body has a tip formed essentially of two sections: a planar annulus at a radially innermost portion of the tip; and a frustoconical section sloping radially outwardly from the planar annulus. The planar annulus surrounds an opening to the bore in the cylindrical body. In a preferred embodiment, the frustoconical section slopes linearly away from an outer diameter of the annulus (e.g., at about 5°–15°) to an outer diameter of the cylindrical body.

The female connector member has a cavity for matably receiving the male connector member. In a preferred embodiment, the female connector member is a shaped port in a wall of an accumulator in a fuel injection system. The male connector member is threaded within the port or cavity. The cavity has an end defined by a planar annular seat positioned parallel to the planar annulus when the male connector member is inserted into the female connector member. The seat surrounds a second bore disposed in the female connector member.

The flat annular seal disc is compressibly seatable between the planar annulus and the planar seat to seal between the male and female members and to permit fluid communication between the first and second bores. The seal disk is preferably made of stainless steel, softer than the male and female members. For example, type 303 stainless steel has been found to provide desired results.

In an embodiment, the male connector member is part of a fuel pressure transducer for a fuel injection system, and the female connector member is a port on an accumulator of a high-pressure fuel pump.

An advantage of the present invention is that provides a high-pressure fluid connector structure which provides is reliably sealable. In particular, the geometry of the connector advantageously concentrates compression of the seal disc where the compression is needed to effect sealing—around the fluid bore. This is initially accomplished at the region of the planar annulus, at a radially inward position of the disc. Radially outwardly from the annulus, the frustoconical surface of the male member gradually places less compression on the seal disc. It has been found that an embodiment of the connector adequately seals fluids at pressures of at least 40,000 psig.

Another advantage of the present invention is that the seal disc plastically deforms from a radially inward zone thereof, but this portion is always surrounded outwardly by an elastic zone, preventing uncontrolled extrusion of the seal disc material and associated load loss. The plastic compression zone of the disc grows radially outward with increased advancement of the male connector member into the cavity.

An additional advantage is that the present invention is easily assembled and requires few parts. Previous conduit connectors are known which have more components and which require bolts for compressing the seal. Because, in an embodiment, the male member of the present invention is threaded at its outer diameter, the frustoconical male member tip achieves adequate axial sealing compression without subjecting the threads to overly high loads.

Additional features and advantages of the present invention are described in, and will be apparent from, the detailed description of the preferred embodiments and from the drawings.

DETAILED DESCRIPTION OF THE DRAWINGS

Figure 1:
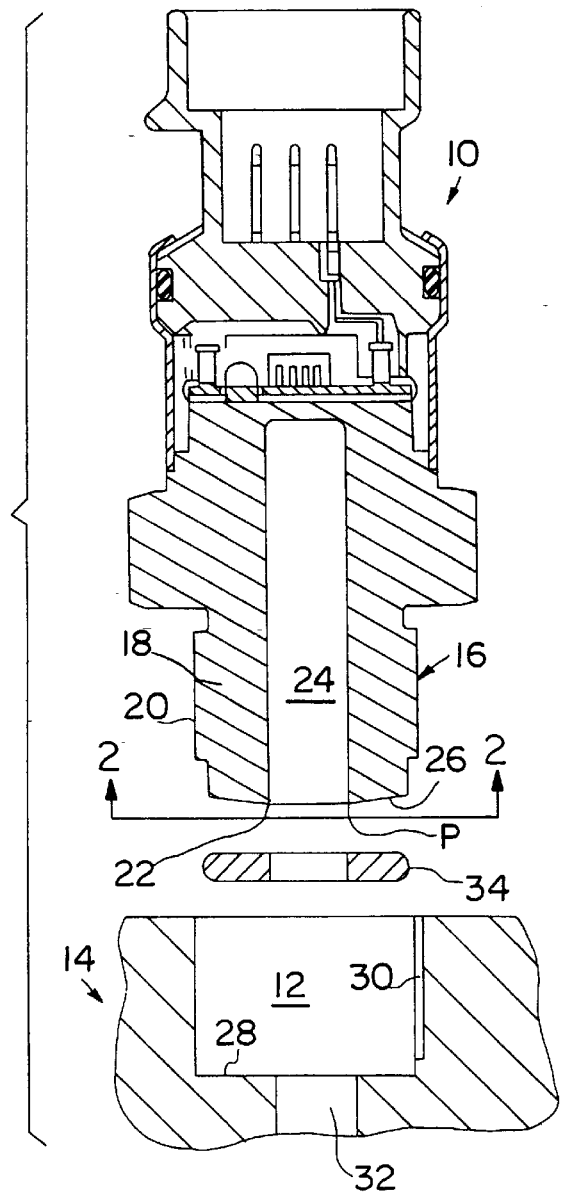
FIG. 1 is an exploded side sectional view of a connector according to an embodiment of the present invention.

Referring to the FIGS., wherein like numerals designate like parts, FIG. 1 shows a sealable connector structure in exploded view. In this embodiment, the connector structure includes a fuel pressure sensor 10 which is threadably matable into a port or cavity 12 formed in female connector member 14. In FIG. 1, the female connector member 14 is illustrated as a wall of an accumulator of a high-pressure fuel pump of a diesel fuel injection system.

Figure 2:
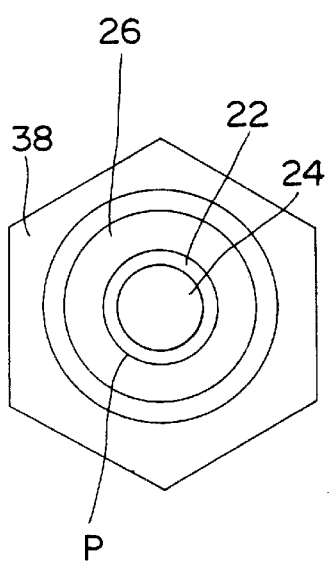
FIG. 2 is a base view of a male connector member as illustrated in FIG. 1, the view being taken generally from line A—A of FIG. 1.

In particular, the sensor 10 has a male connector member 16 generally having a cylindrical body 18. The cylindrical body 18 has external threads 20 at its outer diameter (also shown in FIG. 3). According to an embodiment of the invention, and as also illustrated in FIG. 2, the cylindrical body 18 includes a shaped tip having a flat surface or planar annulus 22 at a radially innermost portion. This planar annulus 22 has an inner diameter which defines an opening to a longitudinal first bore 24 extending into the sensor 10. An outer diameter of the annulus 22 is designated by the letter P in FIGS. 1–5. The annulus 22 is the farthest-extending point of the male member 16 in the longitudinal direction.

Also shown in FIGS. 1 and 2, the tip of the cylindrical body 18 further includes a frustoconical section 26 extending radially outwardly from the outer diameter P of the planar annulus 22. In an embodiment, this frustoconical section 26 slopes away from the annulus 22 at about 5°–15°, and especially preferably at about 10°, but within the scope of the invention, the slope may be varied by a few degrees less or more.

Referring to FIG. 1, the female connector member 14 has a supporting body, e.g. the accumulator wall, which has the recess or cavity 12 formed therein. The cavity 12 which is shaped to complementarily receive the male connector member 16. According to the invention, the cavity 12 has an end defined by a flat surface or planar annular seat 28. The seat 28 surrounds an opening to a second bore 32 extending into the accumulator. In an embodiment, this second bore 32 is equal to or smaller in diameter than the first bore 24 in the sensor. Furthermore, in the embodiment illustrated, the cavity 12 is also defined by a cylindrical wall 30 tapped with threads corresponding to the threads 20 on the male connector member 16.

The connector further includes a seal disc 34, which is annular and generally planar in shape. The seal disc 34 fits within the cavity 12 against the annular seat 28. The seal disc 34 has a central opening which is preferably no greater in diameter than the first bore 24. In an embodiment, the opening in the seal disc 34 may have a smaller diameter than the first bore 24. When the connector is assembled, the opening in the seal disc 34 forms a continuous channel between the bores 24 and 36. Additionally, the seal disc 34 preferably has an outer diameter, in an uncompressed condition, which is slightly smaller than a diameter of the cavity 12 of the female connector member 14. Such sizing helps to properly center the seal disc 34 during assembly.

The male connector member 16 is threaded into the cavity 12 until the seal disc 34 is compressed between the planar seat 28 and the tip of the male connector member 16. In the embodiment illustrated in FIGS. 1 and 2, the sensor 10 has a hex-shaped portion 38 connected to the male connector member 16 for torquing with a wrench.

The male connector member 16 and female connector member 14 are made of materials harder than the annular seal disc 34. The annular seal disc is preferably made of metal, and a 300 series stainless steel, for example, type 303 or type 316 stainless steel, is known to provide the desired results. The seal disc 34 material and hardness may vary, depending on the design pressures, the dimensions, the application of the connector, etc. In an embodiment, the seal disc 34 has a Rockwell (B-scale) hardness in the range of about 70–120. Where type 303 stainless steel is used, the Rockwell (B-scale) hardness is typically in the range of about 80–100, and preferably about 85–95. A suitable material for the accumulator wall, i.e., the female member 14, includes stainless steel or alloy steel, and a preferred material is SAE 4340 stainless steel, having a Rockwell (C-scale) hardness of about 40–46. The male member 16 may also be made of stainless steel, for example, 15-5 stainless steel which has a Rockwell (C-scale) hardness of about 40–47.

In conjunction with the relative hardness of the disc to the male and female members, the surface area of the planar annulus 22 is sized to compress the seal disc 32 slightly beyond its elastic limit. This creates a contact pressure on both sides of the seal disc 34 to sufficiently seal at the design limit pressure of the medium, which in a high-pressure fuel injection environment may be 30,000 psig.

Figure 3:
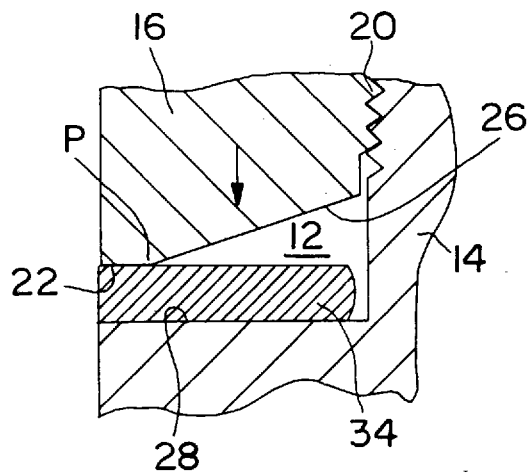
FIGS. 3–5 are enlarged fragmentary sectional views of the connector according to the embodiment of FIGS. 1 and 2, illustrating successively increased states of compression of the seal disc.
Figure 4:
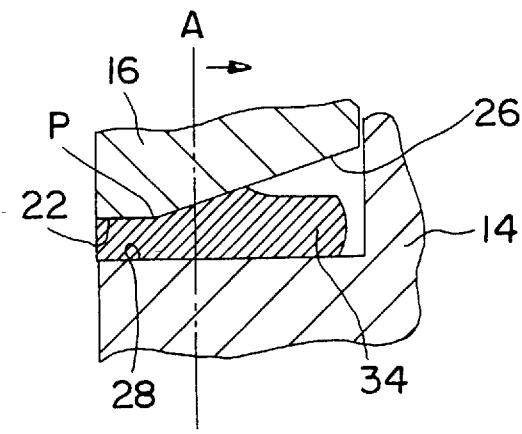
Figure 5:
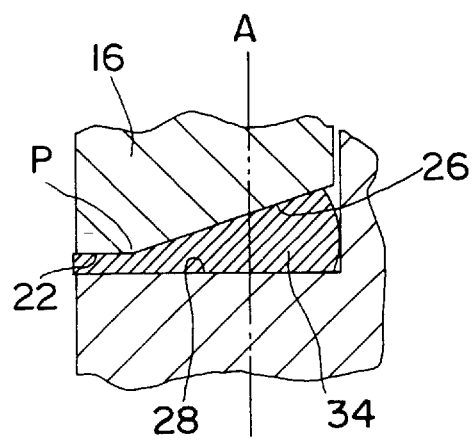

More particularly, turning to FIGS. 3–5, the seal disc 34 is shown in sequential states of increasing compression during insertion of the male member 16 into the cavity 12. Note that FIGS. 3–5 are not necessarily to scale and are shown in an exaggerated manner to better illustrate the general structural geometry and seal disc compression. When the male connector member 16 is inserted into the cavity 12, the male member 16 initially engages the seal disc 34 at the planar annulus 22, as illustrated in FIG. 3. Accordingly, axial compression of the seal disc 34 is concentrated where the sealing is required—in the region adjacent to the bores 24 and 32 which are to contain the pressurized fuel (not shown). The flat annular seat 28 of the female connector member 14 firmly supports the opposite side of the seal disc 34 for the appropriate load distribution.

As the planar annulus 22 compresses into the softer seal disc 34, the area of contact increases along the surface of the frustoconical section 28. The higher the applied load, the deeper the penetration, and the larger the contact area. Turning to FIG. 4, a continued application of torque to the male member 16 causes deeper insertion into the cavity 12, compressing the seal disc 34. Of course, the seal disc 34 is subject to the greatest deformation under the planar annulus 22, which is the deepest-extending point of the male member 16. Along the slope of the frustoconical section 26, the deformation of the disc 34 gradually decreases radially outwardly from the planar annulus 22.

The male member 16 is matably inserted with a sufficient force to plastically compress a radially inward zone of the inner the seal disc 34, an outer limit of this plastic zone designated as line A in FIG. 4, hence the plastic zone being to the left of line A. The plastic compression zone is surrounded radially outwardly by an elastic compression zone to the right of line A. At the plastic compression zone (left of line A), the seal disc 34 is in a highly-sealing surface-to-surface compression against the male connector member 16 and the flat seat 28 of the female connector member 12. In the elastic compression zone (right of line A) the seal disc 34 is in linear compression between at least a portion of the frustoconical section 26 of the male member 16 and the flat seat 28 of the female member 14.

Further advancement of the male connector member 16 deeper into the cavity 12 results in increased compression and deformation of the seal disc 34 in the aforementioned manner. As illustrated in FIG. 5, the plastic compression zone increases accordingly, the outer limit of the plastic compression moving radially outward, as indicated by line A.

By concentrating the load on the seal disc this manner, i.e., at an innermost radial area, sufficient sealing of the pressurized fluid is realized and while minimizing the total axial load required. The risk of over-compressing the seal disc 34 is reduced by the radially outward elastic compression zone. Over-compression could happen more easily in a conventional connector, for example, where a seal disc could be compressed uniformly across its radius to a point of uncontrolled plasticity, resulting in extrusion of the seal material and load loss. According to the illustrated embodiment of the invention, because the seal disc 34 is compressible with varying degrees of plastic deformation radially outwardly from the bore, adequate sealing can be achieved in most applications without requiring a precision torquing of the male member 16 during assembly.

Therefore, properly designing the geometry of the tip of the male member, e.g., sizing the area of the annulus 22 for the particular seal material, total load on the disc 34 continues to increase with penetration of the tip of the male connector member. Additionally, the sensor can be torqued easily to the proper sealing pressure without fear of over-deforming the seal.

An embodiment of the invention may require around 60 ft-lbs of torque. This corresponds to an embodiment wherein the annulus 22 has an inner diameter of 6.35 mm and an outer diameter of 8.35 mm. The outer diameter of the frustoconical surface can be, for example, about 15.5 mm. of course, these dimensions, the area of the annulus, the slope of the frustoconical section, the hardness of the disc, etc., are dependent upon the particular application of the connector, the required size of the connector components, the design pressure, or other factors.

It should be understood that various changes and modifications to the preferred embodiments will be apparent to those skilled in the art. For example, the structure of the claimed connector is described in relation to a fuel pressure sensor, but could also be adapted to any environment requiring sealed fluid communication, such as for connecting tubing sections together. Also, the present invention could be used in vacuum systems, as well as pressure systems. Such apparent changes and modifications may be made without departing from the spirit and scope of the present invention and without diminishing its attendant advantages. Therefore, the appended claims are intended to cover such changes and modifications.

What is claimed is:

1. A sealable fluid connector comprising:
   a male connector member including:
      a cylindrical body with a first bore disposed longitudinally therein, said body having a tip with a planar annulus at a radially innermost portion of said tip and surrounding an opening to said first bore, and said body having a frustoconical section sloping radially outwardly from said planar annulus;
   a female connector member including a cavity for receiving said male connector member with a complementarily threaded engagement, an end of said cavity is defined by a planar annular seat which is parallel to said planar annulus when said male connector member is inserted, said seat surrounding a second bore disposed in said female connector member; and
   an annular seal disc compressibly seatable between said planar annulus and said planar seat to seal between said male and female members and to permit fluid communication between said first and second bores, whereby when said male connector member is matably received in said cavity, said seal disc is caused to have a radially-inward plastic compression zone radially-outwardly surrounded by a gradually-decreasing elastic compression zone.

2. A connector according to claim 1, wherein said frustoconical section slopes away from said planar annulus at about 5°–15°.

3. A connector according to claim 1, wherein said seal disc is made of stainless steel having a Rockwell (B-scale) hardness of about 80–100.

4. A connector according to claim 1, wherein said male connector member is portion of a fuel pressure sensor.

5. A connector according to claim 1, wherein said seal disc has an inner diameter no greater than a diameter of the first bore.

6. A connector according to claim 1, wherein said seal disc has an outer diameter slightly smaller than a diameter of said cavity of said female connector member.

7. A fuel pressure sensor for detecting fuel pressure in an engine, the sensor comprising:
   a male connector member having:
      a generally cylindrical body with a bore extending centrally therethrough, an outer diameter of said cylindrical body having threads for engagably moving said male connector member in an axial direction;
      a planar annulus formed at a tip of said body adjacently surrounding an opening to said bore;
      a frustoconical section of said body linearly sloping radially outwardly from said planar annulus to said outer diameter of said cylindrical body; and
   a planar annular seal disc for compressibly engaging against said planar annulus and at least a portion of said frustoconical section to plastically compress said disc at a radially-inward zone which is radially-outwardly surrounded by a zone of gradually-decreasing elastic compression, said seal disc having a central opening alignable with said bore of said male connector member.

8. A fuel pressure sensor according to claim 8, wherein said seal disc is made of metal having a Rockwell (B-scale) hardness of about 80–100.

9. A fuel pressure sensor according to claim 7, wherein said seal disc is made of metal having a Rockwell (B-scale) hardness of about 85–95.

10. A fuel pressure sensor according to claim 7, further comprising:
    a female connector member formed in a wall of a fuel pump accumulator, said bores providing communication of pressurized fuel from said accumulator to said bore in said cylindrical body, said female connector member including a supporting body having a generally cylindrical cavity therein, said cavity shaped to threadably receive said male connector member, a bottom of said cavity forming a planar annular seat to support said seal disc.

11. A fuel pressure sensor according to claim 7, wherein the slope of said frustoconical section is about 5°–15° from a plane of said annulus.

12. A fluid connector comprising:
    a male member having a generally cylindrical body with an annular tip, a central bore extending longitudinally through said body, said tip having a flat annulus with an inner radius defining said bore and an outer radius, said tip having a frustoconical section extending radially outward from said outer diameter of said annulus to an outer diameter of said body;

a female member having supporting body with a cavity formed therein to complementarily receive said male member in a threaded engagement, said cavity having a planar bottom with a central bore formed therein; and a generally planar seal disc having a central bore formed therein, the bore being no larger in diameter than said inner diameter of said annulus, the seal disc being sealably compressible between said bottom of said female cavity and said tip such that the bore of said male member is in fluid communication with the bore of said female member through said central bore of said seal disc;

whereby, in a mated state wherein said male member inserted in said cavity, the seal disc is caused to plastically compress at a radially-inward zone which is radially-outwardly surrounded by a zone of elastic compression.

13. A connector according to claim 12, whereby increased insertion of said male member into said cavity against said seal disc causes an expansion of said zone of plastic compression of said seal disc in a radially-outward direction.

14. A connector according to claim 12, wherein said frustoconical section has a slope of about 5°–15°.

15. A connector according to claim 12, wherein said disc is made of a softer material than said male and female members, and wherein said disc has a Rockwell (B-scale) hardness of about 70–120.

16. A connector according to claim 12, wherein said seal disc has an outer diameter slightly smaller than an outer diameter of said cavity.

17. A connector according to claim 12, wherein said male connector member is a mounting portion of a fuel pressure sensor, and wherein said female connector member is a wall of a fuel pump accumulator, said bores providing communication of pressurized fuel from said accumulator to said sensor.

* * * * *